United States Patent [19]
Brown

[11] Patent Number: 5,096,252
[45] Date of Patent: Mar. 17, 1992

[54] TRUCK CAB SPEAKER AND SEAT ORGANIZATION

[76] Inventor: Jeffery L. Brown, 330 Cherry St., Waterford, Pa. 16441

[21] Appl. No.: 715,671

[22] Filed: Jun. 14, 1991

[51] Int. Cl.⁵ ............................................. B62D 33/06
[52] U.S. Cl. .................................... 296/190; 296/63; 297/445; 181/141
[58] Field of Search ................ 296/190, 37.8, 63; 297/397, 391, 445; 181/141, 145

[56] References Cited

U.S. PATENT DOCUMENTS

| | | | |
|---|---|---|---|
| 3,446,526 | 5/1969 | Peters | 296/63 |
| 3,893,731 | 7/1975 | Maggs | 297/445 |
| 4,440,443 | 4/1984 | Nordskog | 297/397 |
| 4,597,470 | 7/1986 | Takagi et al. | 181/141 |
| 4,758,047 | 7/1988 | Hennington | 297/397 |
| 4,877,105 | 10/1989 | Mugikura | 181/141 |

Primary Examiner—Robert R. Song
Attorney, Agent, or Firm—Leon Gilden

[57] ABSTRACT

A truck cab includes a seat member that includes a vertical seat portion mounted to a horizontal seat portion. The vertical seat portion includes a grid of apertures directed therethrough to provide directed audio communication to an individual mounted within the seat from a speaker positioned rearwardly of the seat within the truck cab. The vertical seat portion includes an acoustical fabric mesh positioned over a forward wall of the vertical seat portion. The invention is further arranged to provide for a cushion insert positioned within the vertical seat portion, with the insert including a matrix of through-extending openings directed through the cushion, wherein the cushion is inflatable for mounting within a framework of the vertical seat portion.

4 Claims, 4 Drawing Sheets

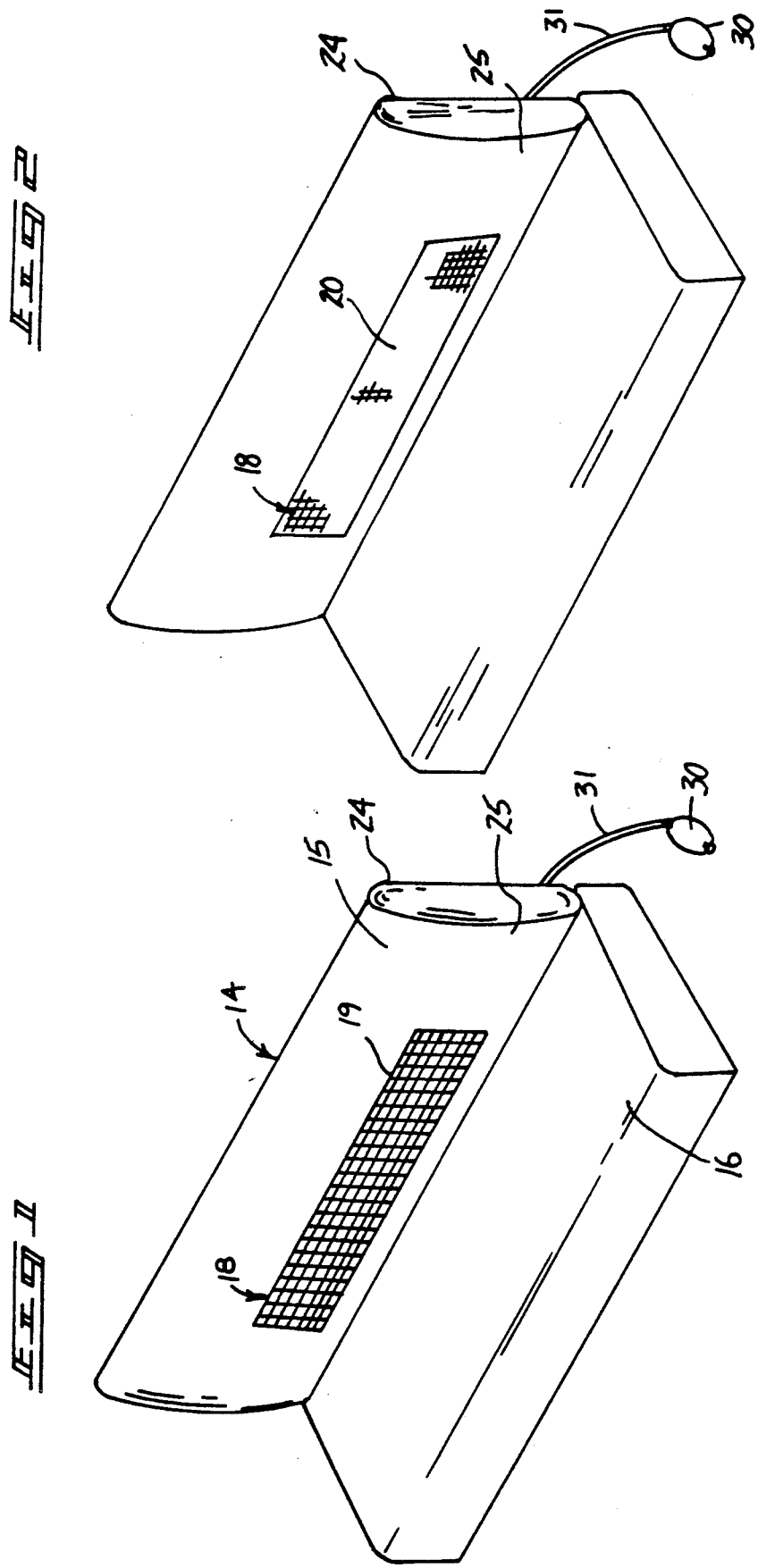

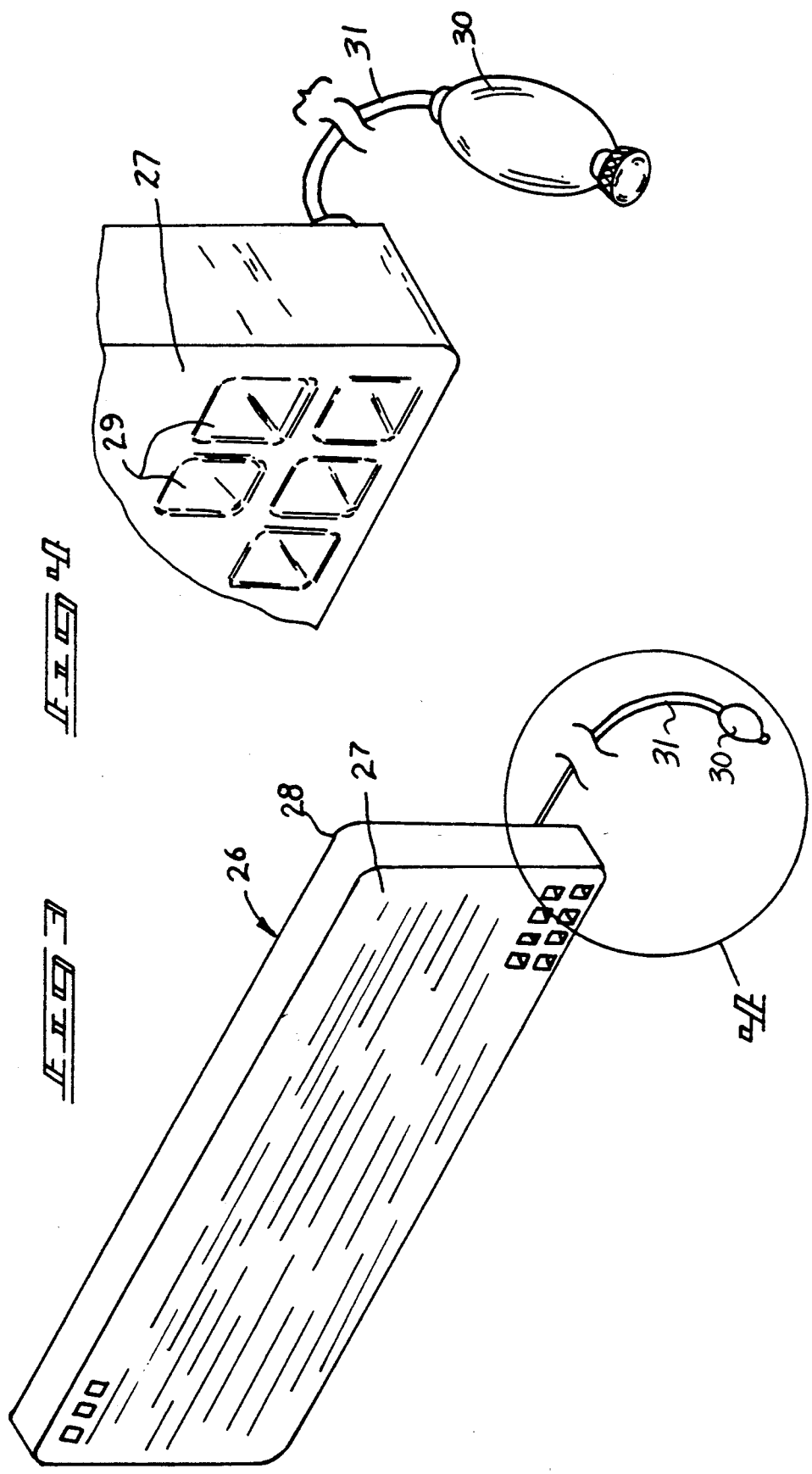

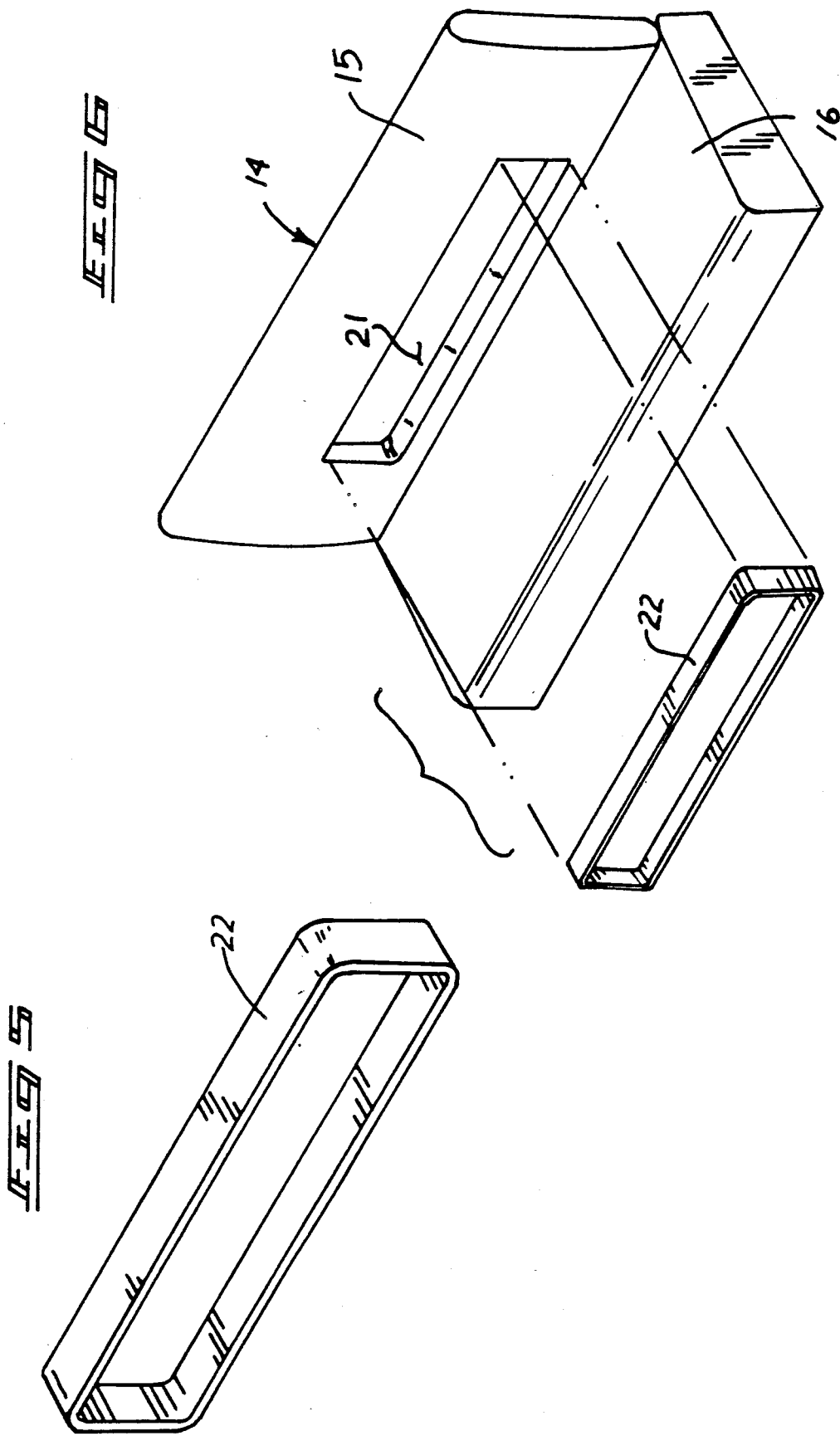

TRUCK CAB SPEAKER AND SEAT ORGANIZATION

BACKGROUND OF THE INVENTION

1. Field of the Invention

The field of invention relates to vehicular audio systems, and more Particularly pertains to a new and improved truck cab speaker and seat organization wherein the same is arranged for enhanced audible projection of an audio signal through an associated seat portion of a truck seat.

2. Description of the Prior Art

In typical truck cab construction, a seat of the truck is in a spaced relationship relative to a rear wall of the truck cab. To position speakers within such a cab organization, the speakers are muffled and muted in directing an audio signal to a forward portion of the cab from a rear portion of the seat structure blocking such signal projection. Spaced limitation within such cab structure limits availability of speaker positioning therewithin.

Prior art speaker construction in association with a seat may be found for example in U.S. Pat. No. 4,440,443 to Nordskog wherein a head rest mounted to a seat portion includes a fluid or air-filled "U" shaped upper pad mounting speakers within opposed side legs of the pad for projection about the head of an individual positioned within the seat as the pad structure is mounted above the vertical seat portion of the seat in use.

U.S. Pat. No. 4,696,370 to Tokumo, et al. sets forth a head rest for use with a seat, wherein the head rest includes a plurality of speakers mounted therewithin.

U.S. Pat. No. 4,758,047 to Hennington sets forth a further example of a head rest mounting a seat speaker system therewithin.

As such, it may be appreciated that there continues to be a need for a new and improved truck cab speaker and seat organization as set forth by the instant invention which addresses both the problems of ease of use as well as effectiveness in construction wherein the seat structure includes directional cells for directing audio signals through the seat from a speaker organization positioned rearwardly and in a spaced relationship from the seat adjacent a rear wall of an associated truck cab and in this respect, the present invention substantially fulfills this need.

SUMMARY OF THE INVENTION

In view of the foregoing disadvantages inherent in the known types of vehicular speaker arrangements now present in the prior art, the present invention provides a truck cab speaker and seat organization wherein the same includes an audio transmissive seat structure to direct audio signals through the seat. As such, the general purpose of the present invention, which will be described subsequently in greater detail, is to provide a new and improved truck cab speaker and seat organization which has all the advantages of the prior art speaker apparatus and none of the disadvantages.

To attain this, the present invention provides a truck cab including a seat member that includes a vertical seat portion mounted to a horizontal seat portion. The vertical seat portion includes a grid of apertures directed therethrough to provide directed audio communication to an individual mounted within the seat from a speaker positioned rearwardly of the seat within the truck cab. The vertical seat portion includes an acoustical fabric mesh positioned over a forward wall of the vertical seat portion. The invention is further arranged to provide for a cushion insert positioned within the vertical seat portion, with the insert including a matrix of through-extending openings directed through the cushion, wherein the cushion is inflatable for mounting within a framework of the vertical seat portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck cab speaker and seat organization which has all the advantages of the prior art speaker apparatus and none of the disadvantages.

It is another object of the present invention to provide a new and improved truck cab speaker and seat organization which may be easily and efficiently manufactured and marketed.

It is a further object of the present invention to provide a new and improved truck cab speaker and seat organization which is of a durable and reliable construction.

An even further object of the present invention is to provide a new and improved truck cab speaker and seat organization which is susceptible of a low cost of manufacture with regard to both materials and labor, and which accordingly is then susceptible of low prices of sale to the consuming public, thereby making such truck cap speaker and seat organizations economically available to the buying public.

Still yet another object of the present invention is to provide a new and improved truck cab speaker and seat organization which provides in the apparatuses and methods of the prior art some of the advantages thereof, while simultaneously overcoming some of the disadvantages normally associated therewith.

Still another object of the present invention is to provide a new and improved truck cab speaker and seat organization wherein the same is arranged for enhanced audio directional access through the seat of an associated truck seat arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the seat structure of the invention.

FIG. 2 is an isometric illustration of a further seat structure utilized by the instant invention.

FIG. 3 is an isometric illustration of the insert utilized by the instant invention.

FIG. 4 is an enlarged isometric illustration of section 4 as set forth in FIG. 3.

FIG. 5 is an isometric illustration of the framework utilized by the seat structure of the invention.

FIG. 6 is an isometric illustration, somewhat exploded, of the framework mounted within the seat structure.

DESCRIPTION OF THE PREFERRED EMBODIMENT

Figure 7:
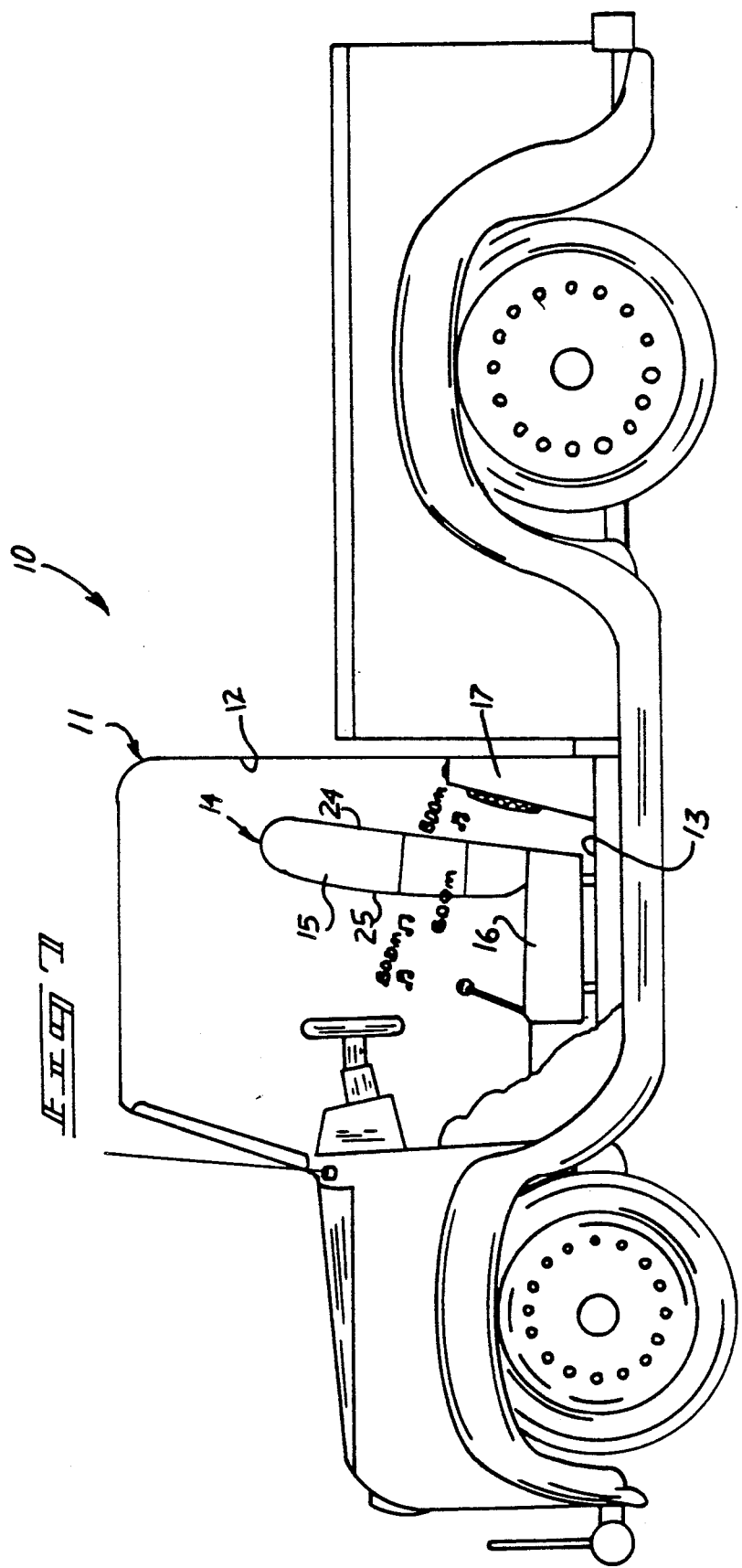
FIG. 7 is an orthographic side view, taken in elevation, of the truck cab speaker and seat organization setting forth the instant invention.

With reference now to the drawings, and in particular to FIGS. 1 to 7 thereof, a new and improved truck cab speaker and seat organization embodying the principles and concepts of the present invention and generally designated by the reference numeral 10 will be described.

More specifically, the truck cab speaker and seat organization 10 of the instant invention essentially comprises, with reference to FIG. 7, a vehicular truck cab 11 of an associated truck assembly, wherein the truck cab includes a truck cab rear wall 12 and a truck cab floor 13 of a passenger compartment defined by the truck cab. A seat member 14 is positioned within the passenger compartment in a spaced relationship relative to the rear wall 12 mounted to the floor 13. The seat member 14 includes a vertical seat portion 15 defined by a predetermined thickness mounted to a horizontal seat portion 16. At least one speaker member 17 or a plurality thereof are positioned or mounted on the floor 13 adjacent the rear wall 12 for projection through and about the seat member 14.

The seat structure of the seat member 14, as illustrated in FIG. 1, includes a rear vertical seat wall 24 spaced from a forward vertical seat wall 25 defining the predetermined thickness therebetween. Acoustical seat insert 18 is positioned within the vertical seat portion 15, and includes a mesh grid covering 19 or a further fabric covering 20, each of an acoustically transmissive material. The rear vertical seat wall 24 may be perforated or of an opened configuration to define a rectilinear through-extending portal opening 21 orthogonally directed through the rear and forward vertical seat walls 24 and 25 defining the opening, wherein the opening receives a rigid rectilinear frame 22 complimentarily mounted within the opening, wherein the frame 22 positions and secures an inflatable insert 26 therewithin. The inflatable insert is of a complementary configuration relative to the interior cavity defined by the rectilinear frame 22. The inflatable insert 26 includes an insert forward wall 27 and an insert rear wall 28 defined by a thickness equal to the predetermined thickness, and including a matrix of through-extending openings 29 directed from the forward vertical seat wall 25 through to the rear vertical seat wall 24. The openings 29 permit acoustical directing of an audio signal from the at least one speaker member 17. An inflation bulb 30 and an inflation conduit 31 permit manual inflation of the insert 26 defined as a pneumatic chamber in surrounding relationship relative to each of the matrix of through-extending openings 29.

The organization therefore permits acoustical passage of an audio signal from the speakers through the seat member 14, and specifically, the vertical seat portion 15 to a passenger or passengers positioned on the seat member within the passenger compartment of the cab 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the U.S. is as follows:

1. A truck cab speaker and seat organization, comprising in combination, a vehicular truck cab, the truck cab including a truck cab rear wall mounted to a truck cab floor, and the truck cab defining a passenger compartment therewithin, wherein the passenger compartment includes a seat member mounted to the truck cab floor spaced from the rear wall, the seat member includes a vertical seat portion mounted to the truck cab floor, and a horizontal seat portion, and an audio speaker member positioned within the truck cab adjacent the rear wall, and the vertical seat portion including a forward vertical seat wall, and a rear vertical seat wall spaced apart a predetermined thickness, and acoustical directing means positioned within the vertical seat portion for directing an audio signal from the speaker member through the vertical seat portion.

2. An apparatus as set forth in claim 1 wherein the acoustical directing means includes a through-extending portal opening defined by a predetermined configuration directed through the vertical seat portion, the portal opening including a rigid framework mounted in contiguous communication, with the portal opening positioned between the forward seat wall and the rear seat wall, and the frame including an inflatable insert mounted coextensively therewithin, the insert defined by an insert thickness equal to the predetermined thickness.

3. An apparatus as set forth in claim 2 wherein the inflatable insert defines a unitary pneumatic chamber, and includes an insert forward wall spaced from an insert rear wall, and includes a matrix of through-extending openings directed from the insert forward wall through the insert rear wall, and wherein the inflatable insert includes an inflation bulb and an inflation conduit in pneumatic communication between the insert and the inflation bulb to effect selective inflation of the insert.

4. An apparatus as set forth in claim 3 wherein the vertical seat portion includes an acoustically transmissive fabric covering coextensively positioned over the portal opening, wherein the acoustically transmissive fabric covering is coextensive with the forward vertical seat wall permitting audio transmission through the insert and the vertical seat portion.

* * * * *